United States Patent
Jang et al.

(10) Patent No.: US 10,123,254 B2
(45) Date of Patent: *Nov. 6, 2018

(54) SYSTEM AND METHOD FOR APPLYING EXTENDED ACCESSING BARRING IN WIRELESS COMMUNICATION SYSTEM

(71) Applicant: Samsung Electronics Co., Ltd., Suwon-si, Gyeonggi-do (KR)

(72) Inventors: Jaehyuk Jang, Suwon-si (KR); Soenghun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,887

(22) Filed: Sep. 21, 2015

(65) Prior Publication Data

US 2016/0014673 A1 Jan. 14, 2016

Related U.S. Application Data

(63) Continuation of application No. 14/731,702, filed on Jun. 5, 2015, which is a continuation of application
(Continued)

(51) Int. Cl.
*H04W 48/02* (2009.01)
*H04W 4/00* (2018.01)
(Continued)

(52) U.S. Cl.
CPC .......... *H04W 48/02* (2013.01); *H04W 4/005* (2013.01); *H04W 4/22* (2013.01);
(Continued)

(58) Field of Classification Search
None
See application file for complete search history.

(56) References Cited

U.S. PATENT DOCUMENTS

| 7,515,928 B2 | 4/2009 | Kang |
| 8,203,987 B2 | 6/2012 | Ishii et al. |

(Continued)

FOREIGN PATENT DOCUMENTS

| CN | 1809187 A | 7/2006 |
| CN | 101213857 A | 7/2008 |

(Continued)

OTHER PUBLICATIONS

LG Electronics Inc., Further Discussion on EAB, 3GPP TSG RAN WG2 #74, R2-113339, May 9-13, 2011, Barcelona, Spain.
(Continued)

*Primary Examiner* — Robert C. Scheibel
(74) *Attorney, Agent, or Firm* — Jefferson IP Law, LLP

(57) ABSTRACT

A system and a method that employs Extended Access Barring (EAB) when a Machine Type Communication (MTC) device performs an attempt to access an evolved Node B (eNB) in a wireless communication system are provided. When User Equipment (UE) supporting MTC, an MTC device, performs an attempt to access a network, the system and method determines whether it can access the network and performs the access procedure. The system and method can control the operations of UE that performs an attempt to access a network, thereby preventing excessive access.

10 Claims, 10 Drawing Sheets

Related U.S. Application Data

No. 13/571,810, filed on Aug. 10, 2012, now Pat. No. 9,084,074.

(60) Provisional application No. 61/521,910, filed on Aug. 10, 2011, provisional application No. 61/531,185, filed on Sep. 6, 2011, provisional application No. 61/545,363, filed on Oct. 10, 2011, provisional application No. 61/559,674, filed on Nov. 14, 2011, provisional application No. 61/563,345, filed on Nov. 23, 2011.

(51) Int. Cl.
*H04W 76/02* (2009.01)
*H04W 74/08* (2009.01)
*H04W 4/22* (2009.01)
*H04W 88/08* (2009.01)
*H04W 84/04* (2009.01)

(52) U.S. Cl.
CPC ....... *H04W 74/0833* (2013.01); *H04W 76/02* (2013.01); *H04W 74/0875* (2013.01); *H04W 84/042* (2013.01); *H04W 88/08* (2013.01)

(56) References Cited

U.S. PATENT DOCUMENTS

| | | | |
|---|---|---|---|
| 8,797,989 B2* | 8/2014 | Lee | H04W 74/0841 370/329 |
| 8,830,828 B2 | 9/2014 | Guo et al. | |
| 8,942,630 B2 | 1/2015 | Lee et al. | |
| 9,072,025 B2 | 6/2015 | Jen et al. | |
| 9,084,074 B2* | 7/2015 | Jang | H04W 48/02 |
| 2004/0180675 A1 | 9/2004 | Choi et al. | |
| 2004/0192313 A1 | 9/2004 | Otting | |
| 2006/0281466 A1 | 12/2006 | Gholmieh et al. | |
| 2007/0004445 A1 | 1/2007 | Dorsey et al. | |
| 2007/0054666 A1 | 3/2007 | Choi | |
| 2007/0268877 A1 | 11/2007 | Buckley et al. | |
| 2008/0200146 A1 | 8/2008 | Wang et al. | |
| 2009/0232118 A1 | 9/2009 | Wang et al. | |
| 2009/0239525 A1 | 9/2009 | Cai et al. | |
| 2010/0029283 A1 | 2/2010 | Iwamura | |
| 2010/0091702 A1 | 4/2010 | Luo et al. | |
| 2010/0110945 A1 | 5/2010 | Koskela et al. | |
| 2010/0118805 A1 | 5/2010 | Ishii et al. | |
| 2010/0197310 A1 | 8/2010 | Jung et al. | |
| 2010/0267405 A1 | 10/2010 | Chin et al. | |
| 2010/0296467 A1 | 11/2010 | Pelletier et al. | |
| 2010/0317356 A1 | 12/2010 | Roessel et al. | |
| 2011/0038277 A1 | 2/2011 | Hu et al. | |
| 2011/0098046 A1 | 4/2011 | Shin | |
| 2011/0103328 A1 | 5/2011 | Lee et al. | |
| 2011/0105123 A1 | 5/2011 | Lee et al. | |
| 2011/0124334 A1 | 5/2011 | Brisebois et al. | |
| 2011/0164560 A1 | 7/2011 | Ki et al. | |
| 2011/0170503 A1 | 7/2011 | Chun et al. | |
| 2011/0171967 A1 | 7/2011 | Lee et al. | |
| 2011/0183662 A1 | 7/2011 | Lee et al. | |
| 2011/0190000 A1 | 8/2011 | Kwun | |
| 2011/0216732 A1 | 9/2011 | Maeda et al. | |
| 2011/0275365 A1* | 11/2011 | Fischer | H04W 76/027 455/423 |
| 2012/0263039 A1* | 10/2012 | Ou | H04W 28/0205 370/235 |
| 2012/0307632 A1* | 12/2012 | Guo | H04W 48/06 370/230 |
| 2013/0265866 A1 | 10/2013 | Yi et al. | |
| 2014/0080531 A1* | 3/2014 | Du | H04W 74/006 455/509 |
| 2014/0171096 A1* | 6/2014 | Hwang | H04W 48/02 455/452.1 |
| 2015/0334636 A1 | 11/2015 | Maeda et al. | |
| 2016/0014672 A1* | 1/2016 | Jang | H04W 48/02 370/230 |
| 2016/0014673 A1* | 1/2016 | Jang | H04W 48/02 370/230 |
| 2017/0195020 A1 | 7/2017 | Ko et al. | |

FOREIGN PATENT DOCUMENTS

| | | |
|---|---|---|
| CN | 101553054 A | 10/2009 |
| CN | 101682896 A | 3/2010 |
| CN | 101841830 A | 9/2010 |
| CN | 102123520 A | 7/2011 |
| CN | 102204357 A | 9/2011 |
| EP | 2369875 A1 | 9/2011 |
| GB | 2461780 A | 1/2010 |
| JP | 2013-135386 A | 7/2013 |
| KR | 10-2010-0126509 A | 12/2010 |
| KR | 10-2010-0133477 A | 12/2010 |
| KR | 10-2010-0137531 A | 12/2010 |
| KR | 10-2011-0109992 A | 10/2011 |
| RU | 2 262 811 C2 | 10/2005 |
| RU | 2 411 697 C2 | 4/2009 |
| RU | 2009121539 C2 | 12/2010 |
| RU | 2009-138002 A | 5/2011 |
| WO | 1998/01004 A2 | 1/1998 |
| WO | 1998/26625 A2 | 6/1998 |
| WO | 2005/122621 A1 | 12/2005 |
| WO | 2008-081816 A1 | 7/2008 |
| WO | 2008-123148 A1 | 10/2008 |
| WO | 2008/137354 A1 | 11/2008 |
| WO | 2008/157575 A1 | 12/2008 |
| WO | 2010/121662 A1 | 10/2010 |
| WO | 2010/124228 A2 | 10/2010 |
| WO | 2012/013355 A1 | 2/2012 |

OTHER PUBLICATIONS

Ericsson, St-Ericsson, Extended access barring for MTC devices, 3GPP TSG RAN WG2 #74, R2-113030, May 9-13, 2011, Barcelona, Spain.
Intel Corporation, EAB for RAN overload protection, 3GPP TSG RAN WG2 #74, R2-113217, May 9-13, 2011, Barcelona, Spain.
Samsung, Overview of solutions on MTC, 3GPP TSG RAN WG2 #74, R2-113261, May 9-13, 2011, Barcelona, Spain.
Intel Corporation, Additional requirements on EAB for RAN overload protection, 3GPP Draft, S1-111152, May 2, 2011, p. 2, line 8, paragraph [4.3.4], Xi'An, China.
3rd Generation Partnership Project, Technical Specification Group Services and System Aspects, Service accessibility (Release 10), 3GPP TS 22.011 V10.3.0, Apr. 1, 2011, paragraph [4.3.1] Sophia Antipolis, France.
3GPP TR 37.806, V1.1.0 (Jun. 2011), 3rd Generation Partnership Project; Technical Specification Group Radio Access Network Extending 850MHz Study Item Technical Report (Release 9), 2009.
Ericsson, Multiple frequency band indicators per cell, 3GPP TSG-RAN WG2 #75, Tdoc R2-114299, Aug. 22-26, 2011, Athens, Greece.
3GPP TS 36.331, V10.2.0 (Jun. 2011), 3rd Generation Partnership Project; Technical Specification Group Radio Access Network; Evolved Universal Terrestrial Radio Access (E-UTRA); Radio Resource Control (RRC); Protocol specification (Release 10), 2011.
LG Electronics Inc, "Applicable Scope of PCI/PSC Range of CSG Cells", 3GPP TSG-RAN WG2 #75bis, Oct. 10-14, 2011, pp. 1-15, Zhuhai, China.
NOKIA Corporation et al., "RACH and Carrier Aggregation", 3GPP TSG-RAN WG2 Meeting #68, Nov. 9-13, 2009, Jeju, South Korea.
Asustek, "Issues of Random Access Procedure on SCell", 3GPP TSG-RAN WG2 Meeting #74, R2-112922, May 9-13, 2011, Barcelona, Spain.
ITRI, "Considerations on Random Access on SCell", 3GPP TSG RAN WG#74, R2-113192, May 9-13, 2011, Barcelona, Spain.
New Postcom, "Consideration on RA Response Window Size for SCell", 3GPP TSG RAN WG2 Meeting#79, R2-123485, Aug. 13-17, 2012, Qingdao, China.

(56) References Cited

OTHER PUBLICATIONS

3rd Generation Partnership Project; Technical Specification Group Services and System Aspects; Service accessibility (Release 11), 3GPP TS 22.011 V11.0.0, Jun. 2011.

LG Electronics Inc., Applicable Scope of PCI/PSC range of CSG cells, 3GPP TSG-RAN WG2 #75bis R2-xxxxxx, XP050540893, Oct. 10-14, 2011, Zhuhai, China.

LG Electronics Inc., Removing linking of primary PLMN to PCI range of CSG cells, 3GPP TSG RAN2 Meeting #75 R2-114521, XP050539644, Aug. 22-26, 2011, Athens, Greece.

Catt; Analysis on FGIs for 3/4-mode UE; 3GPP TSG RAN WG2 Meeting #77bis; R2-121173; Mar. 26-30, 2012; Jeju, KR.

Catt; Corrections and Clarifications on UTRA related FGIs; 3GPP TSG-RAN2 Meeting #77bis; R2-121549; Mar. 26-30, 2012; Jeju, KR.

Catt; Corrections and Clarifications on UTRA related FGIs; 3GPP TSG-RAN2 Meeting #77bis; R2-121551; Mar. 26-30, 2012; Jeju, KR.

LG Electronics Inc; FGI bit 25; 3GPP TSG-RAN WG2 #74; R2-113277; May 9-14, 2011; Barcelona, Spain.

3GPP; 3rd Generation Partnership Project; Technical Specification Group Radio Access Network; Evolved Universal Terrestrial Radio Access (E-UTRA); User Equipment (UE) radio transmission and reception (Release 10); 3GPP TS 36.101; V10.3.0; Jun. 2011.

Vodafone; Rejection of Connections towards a congested CN Node for UMTS and LTE; 3GPP TSG RAN WG3 #69bis; R3-102964; Oct. 11-15, 2010; Xi'an, CN.

Vodafone; Extended ACB for UTRAN; 3GPP TSG RAN WG2 #72;R2-106275; Nov. 15-19, 2010; Jacksonville, FL.

Itri; Handling of Roaming MTC Devices for CN overload control; 3GPP TSG-RAN WG2 #72bis; R2-110399; Jan. 17-21, 2011; Dublin, Ireland.

Nec et al.; vSRVCC Enhancements in TS 24.301 excluding vSRVCC indicator (terminology variant 2); 3GPP TSG CT WG1 Meeting #72; C1-112670; Jun. 27-Jul. 1, 2011; Shanghai, CN.

Interdigital; RACH with Carrier Aggregation; 3GPP TSG-RAN WG2 #69bis; Tdoc R2-102132; Apr. 12-16, 2010; Beijing, CN.

3GPP; 3rd Generation Partnership Project; Technical Specification Group Radio Access Network; Evolved Universal Terrestrial Radio Access (E-UTRA); Medium Access Control (MAC) protocol specification (Release 11); 3GPP TS 36.321; V11.0.0; September 2012; Valbonne, FR.

3GPP; 3rd Generation Partnership Project; Technical Specification Group Radio Access Network; Evolved Universal Terrestrial Radio Access (E-UTRA); Medium Access Control (MAC) protocol specification (Release 10); 3GPP TS 36.321; V10.1.0; Mar. 2011; Valbonne, FR.

Ericsson et al.; Multiple frequency band indicators per cell; 3GPP TSG-RAN2 Meeting #75; R2-114301; Aug. 22-26, 2011; Athens, Greece LG Electronics Inc; MDT coverage optimization enhancement for HetNet; 3GPP TSG-RAN WG2 #75bis; R2-115451; Oct. 10-14, 2011; Zhuhai, China.

Fujitsu; Discussion on PHR for SCell in Rel-11; 3GPP TSG-RAN WG2 Meeting #75; R2-114485; Aug. 22-26, 2011; Athens, Greece.

Interdigital Communications; Completion of Initial Timing Alignment Procedure for SCells; 3GPP TSG-RAN WG2 #75bis; Tdoc R2-115408; Oct. 10-14, 2011; Zhuhai, China.

Samsung; Discussion on CQI/SRS transmission during DRX; 3GPP TSG-RAN2 #75 meeting; Tdoc R2-114180; Aug. 22-26, 2011; Athens, Greece.

3GPP; 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10); 3GPP TS 37.320; V10.3.0; Sep. 2011.

\* cited by examiner

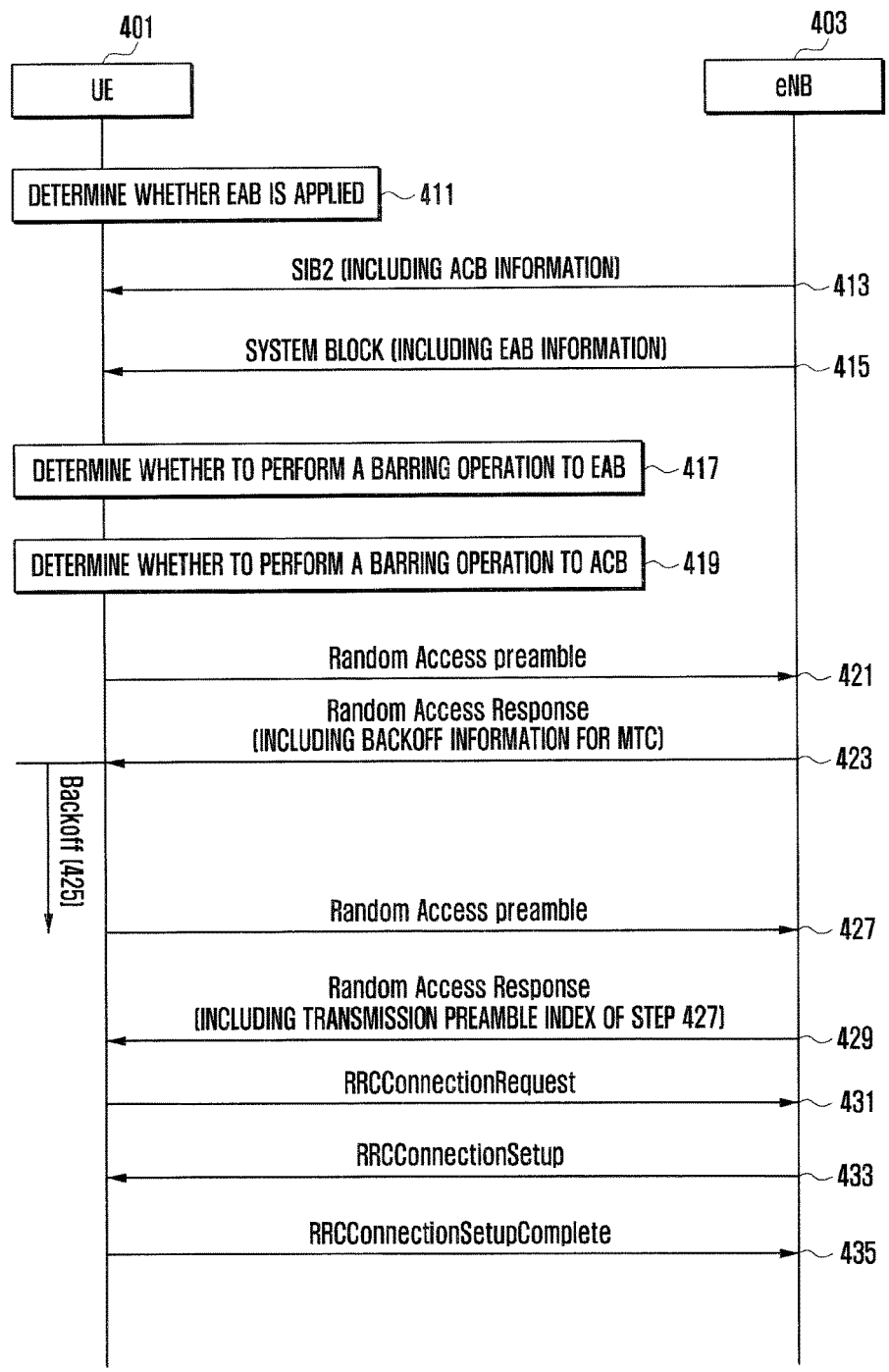

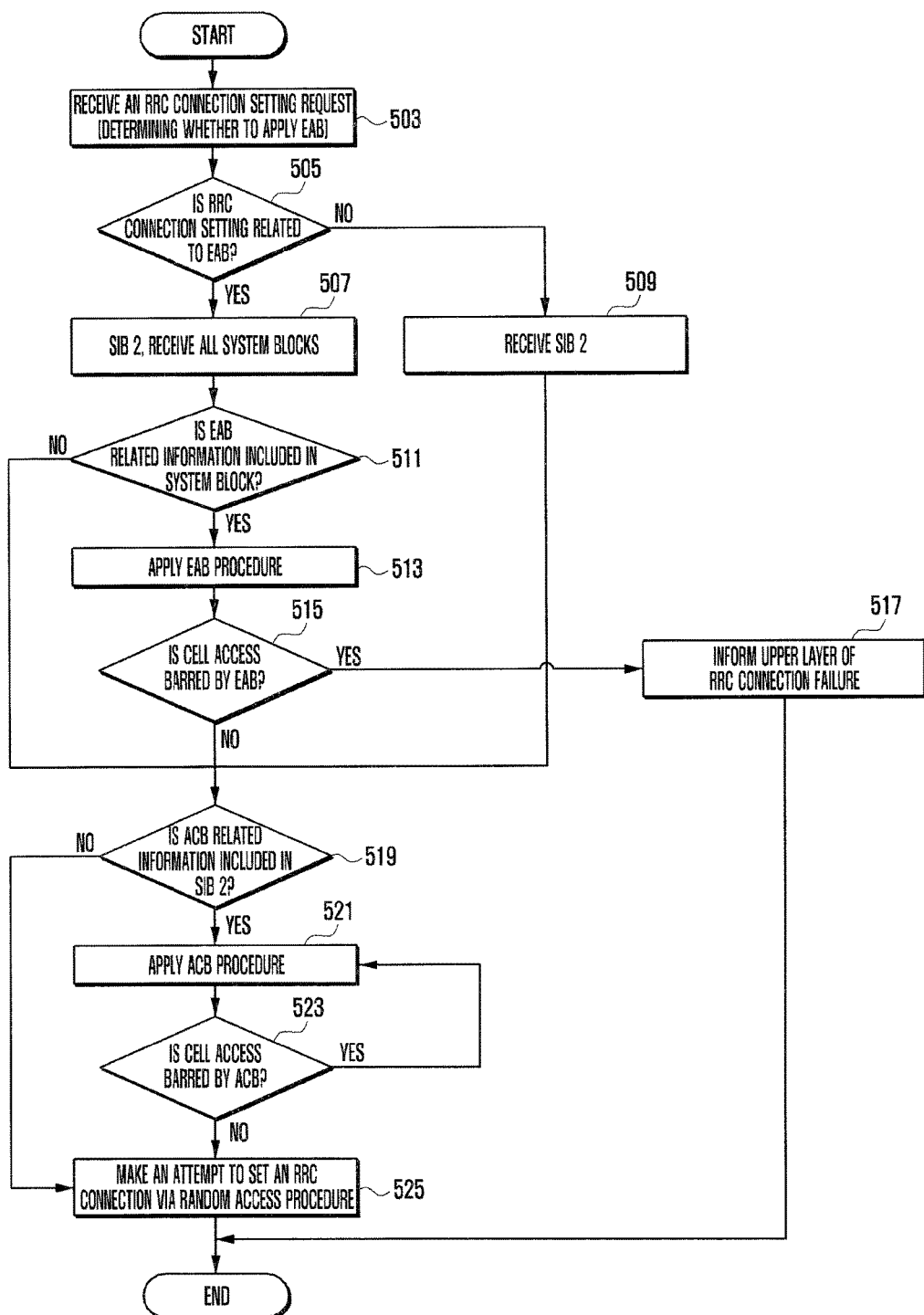

SYSTEM AND METHOD FOR APPLYING EXTENDED ACCESSING BARRING IN WIRELESS COMMUNICATION SYSTEM

CROSS-REFERENCE TO RELATED APPLICATIONS

This application is a continuation application of a prior application Ser. No. 14/731,702, filed on Jun. 5, 2015, which is a continuation application of a prior application Ser. No. 13/571,810, filed on Aug. 10, 2012, which has issued as U.S. Pat. No. 9,084,074 on Jul. 14, 2015 and which claimed the benefit under 35 U.S.C. § 119(e) of U.S. Provisional application filed on Aug. 10, 2011 in the U.S. Patent and Trademark Office and assigned Ser. No. 61/521,910, of U.S. Provisional application filed on Sep. 6, 2011 in the U.S. Patent and Trademark Office and assigned Ser. No. 61/531,185, of U.S. Provisional application filed on Oct. 10, 2011 in the U.S. Patent and Trademark Office and assigned Ser. No. 61/545,363, of U.S. Provisional application filed on Nov. 14, 2011 in the U.S. Patent and Trademark Office and assigned Ser. No. 61/559,674, and of U.S. Provisional application filed on Nov. 23, 2011 in the U.S. Patent and Trademark Office and assigned Ser. No. 61/563,345, the entire disclosure of each of which is hereby incorporated by reference.

BACKGROUND OF THE INVENTION

1. Field of the Invention

The present invention relates to wireless communication systems. More particularly, the present invention relates to a system and a method that determine, when a Machine Type Communication (MTC) device makes an attempt to access a network in a Long Term Evolution (LTE) system, whether the MTC device can access the network and that allows the MTC device to access the network according to the determination.

2. Description of the Related Art

With the rapid development of wireless communication technologies, communication systems have evolved that employ the wireless communication technologies. An example of a 4th Generation mobile communication technology is a Long Term Evolution (LTE) system. The LTE system employs technologies for supporting various types of mobile devices (or User Equipment (UE)) and is related to Machine Type Communication (MTC). MTC devices refer to machines that can communicate with other machines/metering devices such as electric charge meters or water meters, without a user's involvement. MTC devices can attempt to access a network irrespective of the priority.

In order to process MTC devices, LTE release 10 (the term 'release' refers to version information and the larger the number the more recent the version) provides a procedure where a UE that makes an access attempt informs an evolved Node B (eNB) that 'an access request is made by an MTC device' via an access request message; and the eNB determines whether to permit the access request, or, if it rejects the access request, informs the UE of how much time should pass before the UE it can make an access request.

However, the procedure of LTE release 10 is disadvantageous in that the UE must transmit an access request message at the initial stage. In particular, if a number of UEs simultaneously transmit access requests to the eNB, an access overload may occur. Therefore, there is a need for a system that addresses these problems.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a system and method that determines, when a Machine Type Communication (MTC) device makes an attempt to access a network in a wireless communication system, whether the MTC device can access the network before transmitting an access request message to the network, and that allows the UE to make an attempt to access the network according to the determination.

Another aspect of the present invention is to provide a system and method that can process a back off included in a random access reply message while an MTC device without barring the access to a network is performing a random access procedure.

Another aspect of the present invention is to provide a system and method that allows a User Equipment (UE) to identify information regarding Access Class Barring (ACB) and Extended Access Barring (EAB), transmitted from an evolved Node B (eNB), by employing an ACB mechanism and an EAB mechanism before transmitting an access request message to the eNB, and to determine whether the UE can access the eNB.

To this end, although the UE is an MTC device, the UE does not employ the EAB in any of the following cases:
  If the UE makes an access attempt to receive a call (mobile terminated call-Access (mt-Access));
  If the UE makes an emergency call; and
  If the UE makes an access attempt with a high priority (i.e., a highPriorityAccess).

In addition, when EAB and ACB are activated, if an MTC device employs EAB first, and then concludes that it can perform an access attempt, the MTC device employs ACB and then determines whether the access succeeds.

In accordance with an aspect of the present invention, an access control method of a MTC device in a wireless communication system is provided. The method includes determining whether a Radio Resource Control (RRC) connection establishment corresponds to a Cause 1 or a Cause 2, establishing, if the RRC connection establishment corresponds to the Cause 1, the RRC connection so that the RRC connection is not subject to EAB procedure, and determining, if the RRC connection establishment corresponds to the Cause 2, whether to employ the EAB procedure according to an establishment of a System Information Block (SIB) transmitted from an evolved Node B (eNB), and employing the EAB procedure according to the determination.

In accordance with another aspect of the present invention, a MTC device for controlling access to an eNB in a wire communication system is provided. The MTC device includes a transceiver for transmitting and receiving signals to and from the eNB, and a controller. The controller determines whether an RRC connection establishment corresponds to a Cause 1 or a Cause 2, establishes, if the RRC connection establishment corresponds to the Cause 1, the RRC connection so that the RRC connection is not subject to EAB procedure, and determines, if the RRC connection establishment corresponds to the Cause 2, whether to employ the EAB procedure according to an establishment of a SIB transmitted from the eNB, and employing the EAB procedure according to the determination.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which:

FIG. 4 illustrates a flowchart that describes a method via the application of Extended Access Barring (EAB) and Access Class Barring (ACB), according to an exemplary embodiment of the present invention;

FIG. 5 illustrates a flowchart that describes a method for operating a UE, according to a first exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the following exemplary embodiments will be described based on Long Term Evolution (LTE) systems or LTE-Advanced (LTE-A) systems, it should be understood that the invention is not limited to the described exemplary embodiments. That is, the invention can also be applied to various types of communication systems and their modifications if they have technology backgrounds or channels similar to those of LTE and LTE-A systems.

Figure 1:
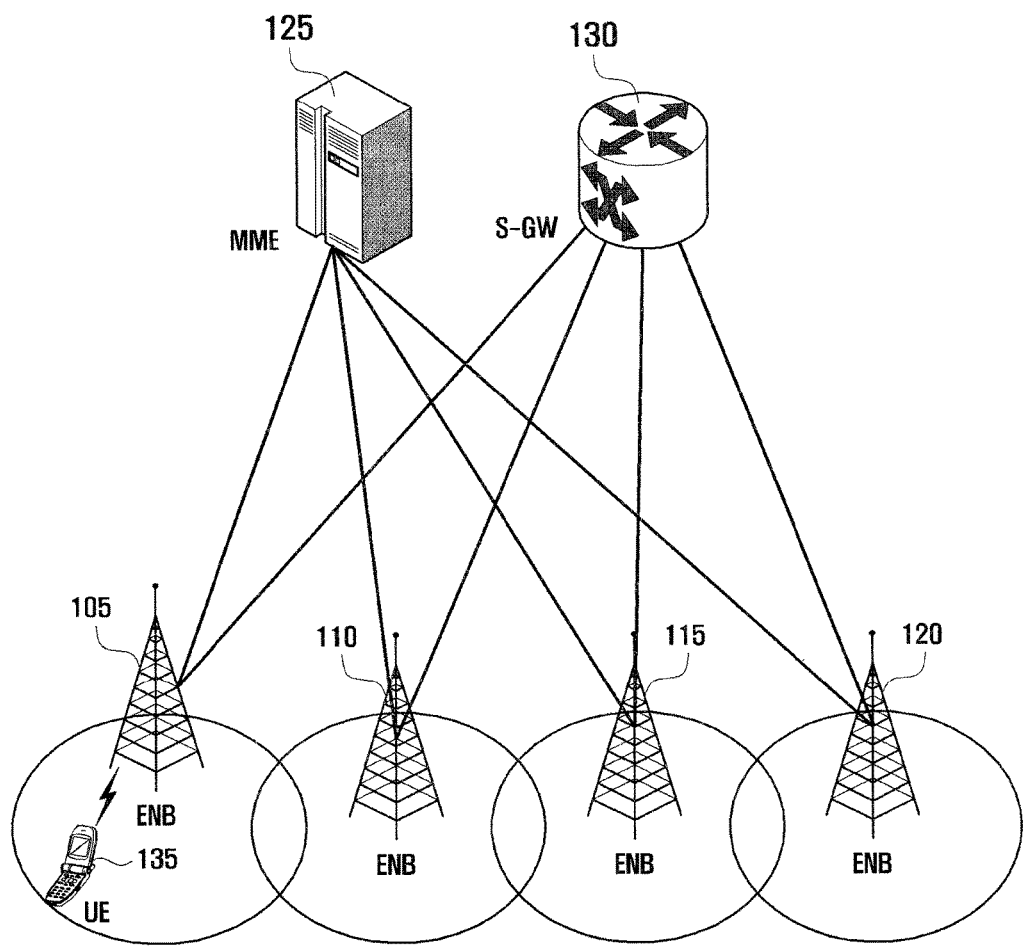
FIG. 1 illustrates a configuration of a Long Term Evolution (LTE) system according to an exemplary embodiment of the present invention.

FIG. 1 illustrates a configuration of an LTE system according to an exemplary embodiment of the present invention.

Referring to FIG. 1, the LTE system configures the wireless access network, including evolved Node Bs (eNBs) 105, 110, 115, and 120, a Mobility Management Entity (MME) 125, and a Serving-Gateway (S-GW) 130. User Equipment (UE) 135 can access an external network via the eNBs 105, 110, 115, and 120 and the S-GW 130.

The eNBs 105, 110, 115 and 120 correspond to Node Bs of the Universal Mobile Telecommunications System (UMTS) system. The eNBs 105, 110, 115 or 120 are connected to the UE 135 via a wireless channel and perform more complicated functions than a Node B of the UMTS system. Since the LTE system provides real time services, such as Voice over Internet Protocol (IP) (VoIP), and all user traffic via a shared channel, the LTE system uses devices that can collect information regarding states, such as states of a buffer of a UE, states of available transmission power, states of channels, etc., and can make a schedule. The eNBs 105, 110, 115 and 120 are examples of such devices. One eNB controls a number of cells. For example, in order to implement a transmission rate of 100 Mbps, the LTE system employs Orthogonal Frequency Division Multiplexing (OFDM) at a bandwidth of 20 MHz, as a wireless access technology. The LTE system also employs Adaptive Modulation & Coding (AMC) to determine a modulation scheme and a channel coding rate, meeting the channel state of the UE. The S-GW 130 provides a data bearer. The S-GW 130 creates or removes data bearers according to the control of the MME 125. The MME 125 manages the mobility of the UE and controls a variety of functions. The MME 125 connects to a number of eNBs, such as eNBs 105, 110, 115 and 120.

Figure 2:
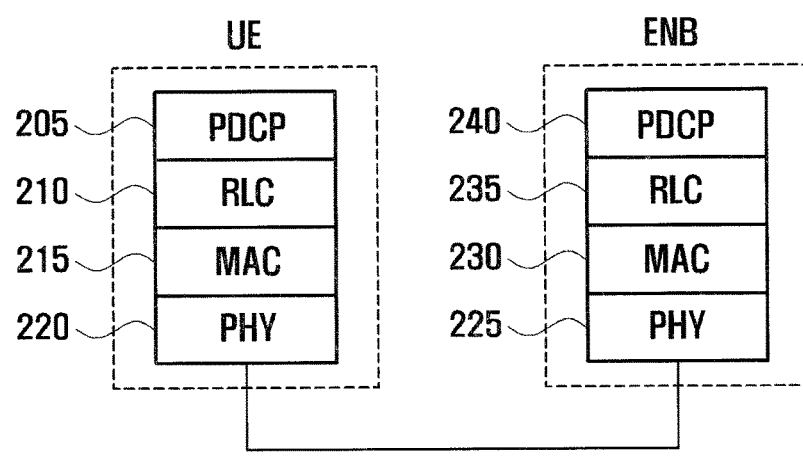
FIG. 2 illustrates a view showing a wireless protocol stack of an LTE system according to an exemplary embodiment of the present invention.

FIG. 2 illustrates a view of the wireless protocol stack of an LTE system according to an exemplary embodiment of the present invention.

Referring to FIG. 2, a UE and an eNB communicate using a Packet Data Convergence Protocol (PDCP) layer 205 and 240, a Radio Link Control (RLC) layer 210 and 235, and a Medium Access Control (MAC) layer 215 and 230, respectively. The PDCP layer 205 and 240 compresses/decompresses an IP header. The RLC layer 210 and 235 reconfigures a PDCP Packet Data Unit (PDU) into a proper size. The MAC layer 215 and 230 connects to a number of RLC layer devices configured in one UE. The MAC layer 215 and 230 multiplexes RLC PUDs to a MAC PDU, and de-multiplex RLC PDUs from MAC PDU. The Physical (PHY) layer 220 and 225 channel-codes and modulates data from the upper layers, creates OFDM symbols, and transmits them via a wireless channel. In addition, the PHY layer 220 and 225 demodulates and channel-decodes OFDM symbols transmitted via a wireless channel, and transfers them to the upper layers. The PHY 220 and 225 also employs Hybrid Automatic Repeat-reQuest (ARQ) to perform additional error correction, where the receiving end determines whether a packet from a transmitting end has been received by transmitting 1 bit to the transmitting end, which is referred to as HARQ ACKnowledgement (ACK)/Negative ACKnowledgement NACK information. Downlink HARQ ACK/NACK information with respect to an uplink transmission is transmitted via a Physical Hybrid-ARQ Indicator Channel (PHICH). Likewise, uplink HARQ ACK/NACK information with respect to downlink transmission is transmitted via a Physical Uplink Control Channel (PUCCH) or Physical Uplink Shared Channel (PUSCH).

Figure 3A:
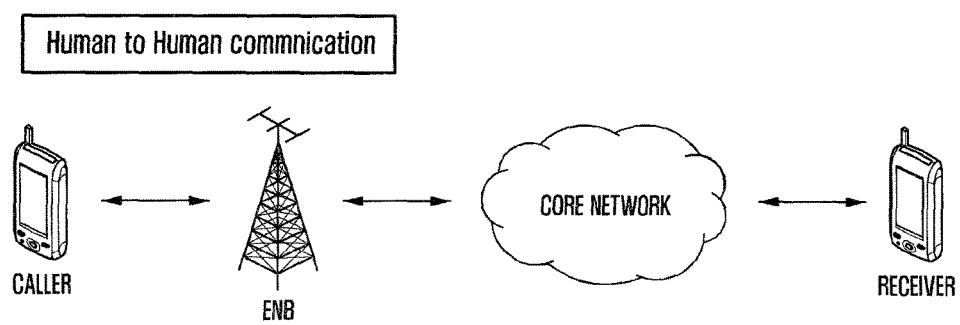
FIG. 3A illustrates a view that describes communication between non-Machine Type Communication (MTC) User Equipments (UEs) according to an exemplary embodiment of the present invention.
Figure 3B:
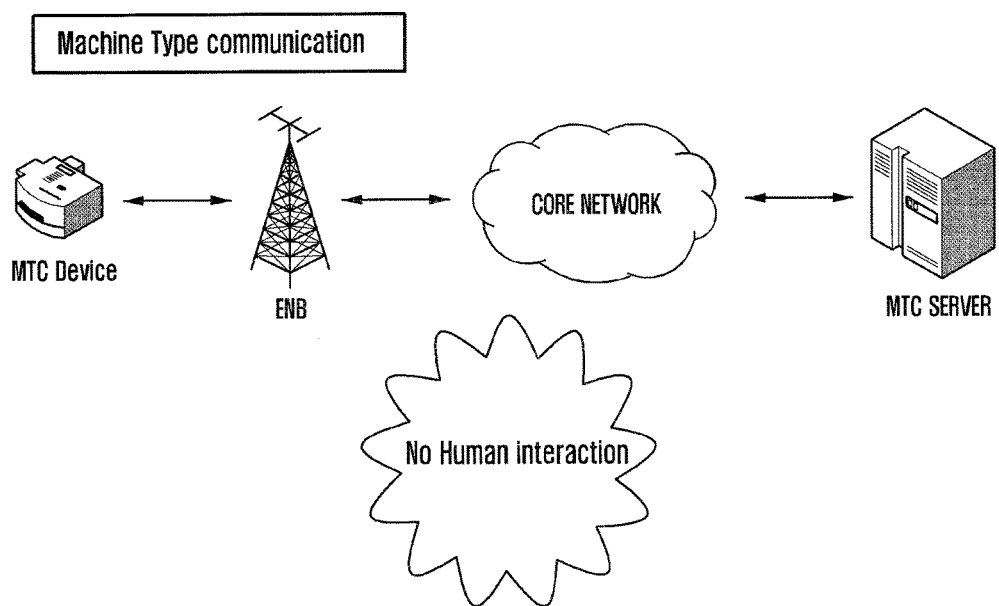
FIG. 3B illustrates a view that describes communication between MTC devices according to an exemplary embodiment of the present invention.

FIG. 3A illustrates a view that describes communication between non-MTC UEs according to an exemplary embodiment of the present invention. FIG. 3B illustrates a view that describes communication between MTC devices according to an exemplary embodiment of the present invention.

Referring to FIG. 3A, when communication, e.g., a voice call, is made between non-MTC UEs, one UE may serve as a caller and the other as a call receiver, while connecting to each other via an eNB and a core network.

On the contrary, referring to FIG. 3B, when communication is made between MTC devices, an MTC device is connected to an MTC server via an eNB and a core network. That is, MTC is performed between machines, and this differs from communication between the UEs shown in FIG. 3A.

In order to bar access from a UE to a network, an LTE system supports an Access Class Barring (ACB) mechanism since LTE release 8, and further Extended Access Barring (EAB) mechanism since LTE release 11. Both, either or neither of ACB and EAB may be used.

An ACB mechanism supported by the LTE system refers to a mechanism that bars access according to Access Classes (ACs) 0 to 15 of a UE stored in a Universal Subscriber Identity Module (USIM) card of a UE. The operation is described in detail as follows.

The UE determines whether a System Information Block No. 2 (SIB 2) transmitted from an eNB includes an ac-BarringInfo parameter. If the UE ascertains that SIB 2 includes the ac-BarringInfo parameter, the UE performs the identification procedure as follows.

If the UE has one or more ACs 11 to 15 that are available, and bit information regarding the available ACs 11 to 15 of UE is set to '1' in ac-BarringForSpecialAC information transmitted from an eNB, the UE can perform an access attempt.

ACs 11-15 being available means that ACs 12, 13 and 14 are available only in a home country of the UE (i.e., a service provider's country to which the UE is subscribed), and ACs 11 and 15 are available only in a Home Public Land Mobile Network (HPLMN) that refers to a service provider to which the UE is subscribed and in an Equivalent Home Public Land Mobile Network (EHPLMN) that refers to a service provider equivalent to the HPLMN.

Otherwise, the UE generates a number between '0' and '1.' If the generated number is less than the ac-BarringFactor parameter value, the UE can perform an access attempt. If the generated number is greater than the ac-BarringFactor parameter value, the UE cannot perform an access attempt.

If access is barred via the processes described above, the UE re-generates a number between '0' and '1.' An access bar time, Tbarring, can be calculated using Equation 1.

$$T\text{barring}=(0.7+0.6\times rand)\times ac\text{-BarringTime} \quad \text{[Equation 1]}$$

An EAB mechanism supported by the LTE system refers to a mechanism that bars access according to ACs 0 to 9 of a UE stored in a USIM card of the UE. The operation is described in detail as follows.

The UE determines whether an SIB transmitted from an eNB includes an EAB parameter. If the UE ascertains that the SIB includes an EAB parameter, the UE performs the identification procedure as follows.

If the UE is included in a category indicated by an eab-Category parameter transmitted from an eNB, and a value between ACs 0 to 9 that the UE belongs to is set to '1' in a bit map of an eab-BarringBitmap parameter, the UE cannot perform an access attempt.

The category of the UE to which the EAB indicated by the eab-Category is applied are divided into three sub-categories as follows:

UEs set for EAB;

UEs, from among the UEs set for EAB, which do not exist on HPLMN or EHPLMN, i.e., UEs of the other service providers; and UEs from among the UEs set for EAB, which do not exist on HPLMN or EHPLMN, or UEs from among the UEs in a roaming process, which do not exist on one of the Public Land Mobile Networks (PLMNs) in the list defined by a service provider stored in the USIM, i.e., UEs from among the UEs set for EAB, which exclude service providers' high priority UEs when roaming.

Otherwise, the UE cannot perform an access attempt.

If access is barred via the processes described above, a notice is made to the upper layer that access is barred via EAB.

FIG. 4 illustrates a flowchart that describes a method via the application of EAB and ACB, according to an exemplary embodiment of the present invention.

A UE 401 receives a request for Radio Resource Control (RRC) connection establishment with an eNB 403 from the upper layer. The upper layer of the UE 401 refers to a Non-Access Stratum (NAS) layer. The upper layer of the UE 401 informs the lower layer of the UE 401 as to whether the RRC connection establishment relates to EAB, i.e., whether EAB should be applied to the RRC connection establishment at step 411. The lower layer of the UE 401 refers to an Access Stratum (AS) layer.

If the upper layer of the UE 401 satisfies the following conditions, despite the UE 401 being an MTC device, it may inform the lower layer that the RRC connection establishment does not relate to EAB in order to employ EAB. The following cases are referred to as 'Cause 1':

If a UE makes an access attempt to receive a call (mobile terminated call-Access (mt-Access));

If a UE makes an emergency call; and

If a UE makes an access attempt with a high priority (highPriorityAccess).

If the upper layer of the UE 401 satisfies the following conditions, it may inform the lower layer that the RRC connection establishment relates to EAB so that the MTC device employs EAB. The following cases are referred to as 'Cause 2':

If a UE makes an access attempt to make a call to transmit data (mobile originated call-Data (mo-Data));

If a UE makes an access attempt to make a call to transmit a control message (mobile originated call-Signaling (mo-Signaling)); and If a UE makes an access attempt to make a call irrespective of a transmission delay such as an MTC service (delayTolerantAccess).

In the present exemplary embodiment, the reasons for discerning between Cause 1 and Cause 2 are as follows.

Regarding Cause 1, mt-Access is used to transmit data for a corresponding UE via a network. The UE 401 cannot determine the importance of the data until it receives the data. Therefore, if an access delay occurs, the UE 401 may lose important data. If the UE 401 delays a call during an emergency situation, this may endanger the user. An access attempt with a high priority is required to be differentiated from a general access attempt or an access with a lower priority.

Regarding Cause 2, this includes a cause that does not cause problems although the UE 401 delays access. Therefore, the upper layer of UE 401 informs the lower layer that an EAB mechanism can be employed for Cause 2 only.

Additionally, when the UE 401 accesses the eNB 403, it receives an SIB 2 from the eNB 403 in order to determine whether to employ ACB, and determines whether SIB 2 includes an AC barring parameter at step 413. If SIB 2 includes an AC barring parameter, UE 401 makes an attempt to access the eNB 403, employing ACB, and determines whether it can access the eNB 403 at step 413.

If the UE 401 ascertains that EAB should be applied to the RRC connection establishment at step 411, the UE 401 receives an SIB from the eNB 403 in order to determine whether the eNB 403 bars EAB related access, and determines whether the SIB includes an EAB related parameter at step 415.

If the SIB includes an EAB related parameter at step 415, the UE 401 performs an attempt to access the eNB 403, employing EAB if it is related to the access, and determines whether it can access the eNB 403.

For the sake of convenience in description, in an exemplary embodiment of the present invention, it is assumed that the eNB 403 employs EAB and ACB. If the RRC connection establishment corresponds to Cause 1, the UE 401 does not apply EAB to the access but applies ACB thereto at step 419. On the contrary, if the RRC connection establishment corresponds to Cause 2, the UE 401 applies EAB and ACB to the access at steps 417 and 419, and determines whether to make an attempt to perform RRC connection establishment. Since the eNB 403 employs EAB and ACB, the UE 401 that has Cause 2 as a cause of RRC connection establishment applies EAB first, prior to ACB, to the access, and then determines whether the access is barred due to EAB. For only the case where the access is not barred due to EAB, the UE 401 applies ACB to the access. If the access is not barred by ACB, the UE 401 may make an attempt to perform RRC connection establishment.

Regarding EAB and ACB, the system is operated as follows.

An ACB mechanism refers to a mechanism that bars the access according to ACs 0 to 15 of the UE 401 stored in a USIM card of the UE 401. The operation is described in detail as follows.

The UE 401 determines whether SIB 2 transmitted from the eNB 403 includes an ac-BarringInfo parameter. If the UE 401 ascertains that SIB 2 includes an ac-BarringInfo parameter, the UE 401 performs the identification procedure as follows.

If the UE 401 has one or more ACs 11 to 15 that are available, and bit information regarding the available ACs 11 to 15 of UE 401 is set to '1' in ac-BarringForSpecialAC information transmitted from an eNB 403, the UE 401 can perform an access attempt.

ACs 11-15 being available means that ACs 12, 13 and 14 are available only in a home country of UE 401 (i.e., a service provider's country to which the UE 401 is subscribed), and ACs 11 and 15 are available only in a HPLMN that refers to a service provider to which the UE 401 is subscribed and in an EHPLMN that refers to a service provider equivalent to the HPLMN.

Otherwise, the UE 401 generates a number between '0' and '1.' If the generated number is less than the ac-BarringFactor parameter value, the UE 401 can perform an access attempt. If the generated number is greater than the ac-BarringFactor parameter value, the UE 401 cannot perform an access attempt.

If access is barred via the processes described above, the UE 401 re-generates a number between '0' and '1.' An access bar time, Tbarring, can be calculated using Equation 2.

$$T\text{barring}=(0.7+0.6\times rand)\times ac\text{-BarringTime} \quad [\text{Equation 2}]$$

An EAB mechanism supported by the LTE system refers to a mechanism that bars the access according to ACs 0 to 9 of the UE 401 stored in a USIM card of UE 401. The operation is described in detail as follows.

The UE 401 determines whether a SIB transmitted from the eNB 403 includes an EAB parameter. If the UE 401 ascertains that SIB includes the EAB parameter, the UE 401 performs the identification procedure as follows.

If the UE 401 is included in a category indicated by an eab-Category parameter transmitted from an eNB 403, and a value between ACs 0 to 9 that the UE 401 belongs to is set to '1' in a bit map of an eab-BarringBitmap parameter, the UE 401 cannot perform an access attempt.

The Category of the UE 401 to which EAB indicated by the eab-Category is applied are divided into three sub-categories as follows:

UEs set for EAB;

UEs, from among the UEs set for EAB, which do not exist on HPLMN or EHPLMN, i.e., UEs of the other service providers; and UEs from among the UEs set for EAB, which do not exist on HPLMN or EHPLMN, or UEs from among the UEs in a roaming process, which do not exist on one of PLMN in the list defined by a service provider stored in the USIM, i.e., UEs from among the UEs set for EAB, which exclude service providers' high priority UEs when roaming.

Otherwise, the UE 401 cannot perform an access attempt.

If access is barred via the processes described above, a notice is made to the upper layer that access is barred via EAB.

After performing steps 417 and 419, if the UE 401 ascertains that the access to a cell is not barred, the UE 401 transmits a Random Access Preamble to the eNB 403 at step 421. The Random Access Preamble indicates one from among the sets noticed by the eNB 403, selected by the UE 401, and is transmitted to the eNB 403. Therefore, the eNB 403 does not detect which UE 401 makes an access attempt thereto.

If the eNB 403 receives the Preamble, the eNB 403 transmits a Random Access Response (RAR) message to the UE 401 at step 423. The RAR message may include the received Preamble index and the resource allocation, Type 1 backoff, and Type 2 backoff value.

Type 1 backoff is applied to a non-MTC UE and not a MTC device. Type 2 backoff is applied to UEs sharing a specific property (e.g., delay tolerant MTC device or EAB configured UE). That is, if the RAR message received at step 423 does not include the index of the Preamble transmitted from the UE 401 to the eNB 403 at step 421 but includes a Type 2 backoff value, the UE 401 waits a Type 2 backoff time period by employing the Type 2 backoff value at step 425. After the Type 2 backoff time period has elapsed at step 425, the UE 401 re-transmits a Random Access Preamble to the eNB 403 at step 427.

For example, if there is only a Type 1 backoff, an EAB configured UE applies the Type 1 backoff algorithm to the access. If there is only a Type 2 backoff, the EAB configured UE applies the Type 2 backoff algorithm to the access. If there are Type 1 backoff and Type 2 backoff, an EAB configured UE applies the Type 2 backoff algorithm first, prior to the Type 1 backoff algorithm, to the access. However, if there is a Type 1 backoff, a non-MTC UE applies the Type 1 backoff algorithm to the access. If there is not a backoff, the non-MTC UE 401 does not apply any backoff algorithm to the access.

A detailed format of the RAR message will be described further below with reference to FIG. 7.

After re-transmitting a Random Access Preamble to the eNB 403 at step 427, the UE 401 receives an RAR message thereto from the eNB 403 at step 429. If the received RAR message includes resource allocation information regarding the Preamble transmitted at step 427, the UE 401 transmits, to the eNB 403, an RRC connection request message, RRCConnectionRequest, including its identifier and the access attempt cause, according to the resource allocation information at step 431.

After receiving the RRC connection request message, the eNB 403 transmits the RRC connection setup message, RRCConnectionSetup, to the UE 401 and accepts the RRC connection setup at step 433. The UE 401 receives the RRC connection setup message from the eNB 403, and transmits an RRC connection setup complete message, RRCConnectionSetupComplete, to the eNB 403, thereby notifying the eNB 403 that RRC connection has been set up at step 435.

FIG. 5 illustrates a flowchart that describes a method for operating a UE, according to a first exemplary embodiment of the present invention.

A UE receives a request for a RRC connection establishment with an eNB from the upper layer (e.g., NAS) at step 503. The upper layer of UE informs the lower layer (e.g., AS) as to whether the RRC connection establishment is related to EAB or the RRC connection establishment employs EAB at step 505.

As described above with respect to FIG. 4, if an RRC connection establishment is requested due to Cause 1, the upper layer of UE informs the lower layer that RRC connection establishment is not related to EAB. If an RRC connection establishment is requested due to Cause 2, the upper layer of UE informs the lower layer that RRC connection establishment is related to EAB.

If RRC connection establishment is related to EAB at step 505, the UE receives SIB 2 and SIB at step 507. On the contrary, if RRC connection establishment is not related to EAB at step 505, UE receives only SIB 2 at step 509.

If RRC connection establishment is related to EAB at step 505 and SIB includes EAB related to information at step 511, the UE performs the EAB procedure at step 513. On the contrary, if RRC connection establishment is related to EAB at step 505, and SIB does not include EAB related to information at step 511 or SIB does not exist at step 509, the UE performs an ACB identification procedure at step 519. That is, UE performs the EAB procedure and then the ACB procedure.

An EAB procedure refers to a mechanism that bars the access according to ACs 0 to 9 of a UE stored in a USIM card of the UE. The operation is described in detail as follows.

The UE determines whether a SIB transmitted from an eNB includes an EAB parameter. If the UE ascertains that SIB includes an EAB parameter, the UE performs the identification procedure as follows.

If the UE is included in a category indicated by an eab-Category parameter transmitted from an eNB, and a value between ACs 0 to 9 that the UE belongs to is set to '1' in a bit map of an eab-BarringBitmap parameter, the UE cannot perform an access attempt.

The category of the UE to which EAB indicated by the eab-Category is applied are divided into three sub-categories as follows:

UEs set for EAB;

UEs, from among the UEs set for EAB, which do not exist on HPLMN or EHPLMN, i.e., UEs of the other service providers; and UEs from among the UEs set for EAB, which do not exist on HPLMN or EHPLMN, or UEs from among the UEs in a roaming process, which do not exist on one of PLMN in the list defined by a service provider stored in the USIM; i.e., UEs from among the UEs set for EAB, which exclude service providers' high priority UEs when roaming.

Otherwise, the UE cannot perform an access attempt.

If access is barred via the processes described above, a notice is made to the upper layer that access is barred via EAB.

After performing the EAB procedure at step 513, the UE determines whether the access is barred by EAB at step 515. If the access is barred by EAB at step 515, UE informs the upper layer of the failure of the RRC connection establishment at step 517 and then terminates the operation.

On the contrary, if the access is not barred by EAB at step 515, the UE determines whether SIB 2 includes ACB information at step 519. If the UE ascertains that SIB 2 includes ACB information at step 519, the UE performs the ACB procedure at step 521. On the contrary, if SIB 2 does not include ACB information at step 519, the UE makes an attempt to perform RRC connection establishment via Random Access procedure at step 525.

The ACB procedure refers to a mechanism that bars access according to ACs 0 to 15 of a UE stored in a USIM card of the UE. The operation is described in detail as follows.

The UE determines whether the SIB 2 transmitted from an eNB includes an ac-BarringInfo parameter. If the UE ascertains that SIB 2 includes an ac-BarringInfo parameter, the UE performs the identification procedure as follows.

If the UE has one or more ACs 11 to 15 that are available, and bit information regarding the available ACs 11 to 15 of UE is set to '1' in ac-BarringForSpecialAC information transmitted from an eNB, the UE can perform an access attempt.

ACs 11-15 being available means that ACs 12, 13 and 14 are available only in a home country of the UE (i.e., a service provider's country to which the UE is subscribed), and ACs 11 and 15 are available only in a HPLMN that refers to a service provider to which the UE is subscribed and in a EHPLMN that refers to a service provider equivalent to the HPLMN.

Otherwise, the UE generates a number between '0' and '1.' If the generated number is less than ac-BarringFactor parameter value, the UE can perform an access attempt. If the generated number is greater than ac-BarringFactor parameter value, the UE cannot perform an access attempt.

If access is barred via the processes described above, the UE re-generates a number between '0' and '1.' An access bar time, Tbarring, can be calculated using Equation 3.

$$Tbarring = (0.7 + 0.6 \times rand) \times ac\text{-BarringTime} \quad \text{[Equation 3]}$$

After performing the ACB procedure at step 521, the UE determines whether a cell access is barred by ACB at step 523. If a cell access has been barred by ACB at step 523, the UE re-applies the ACB procedure to the access after the access bar time, Tbarring, has elapsed at step 521. On the contrary, if a cell access is not barred via ACB at step 523, the UE makes an attempt to perform RRC connection establishment via Random Access procedure at step 525, which is described in detail below with reference to FIG. 6.

Figure 6:
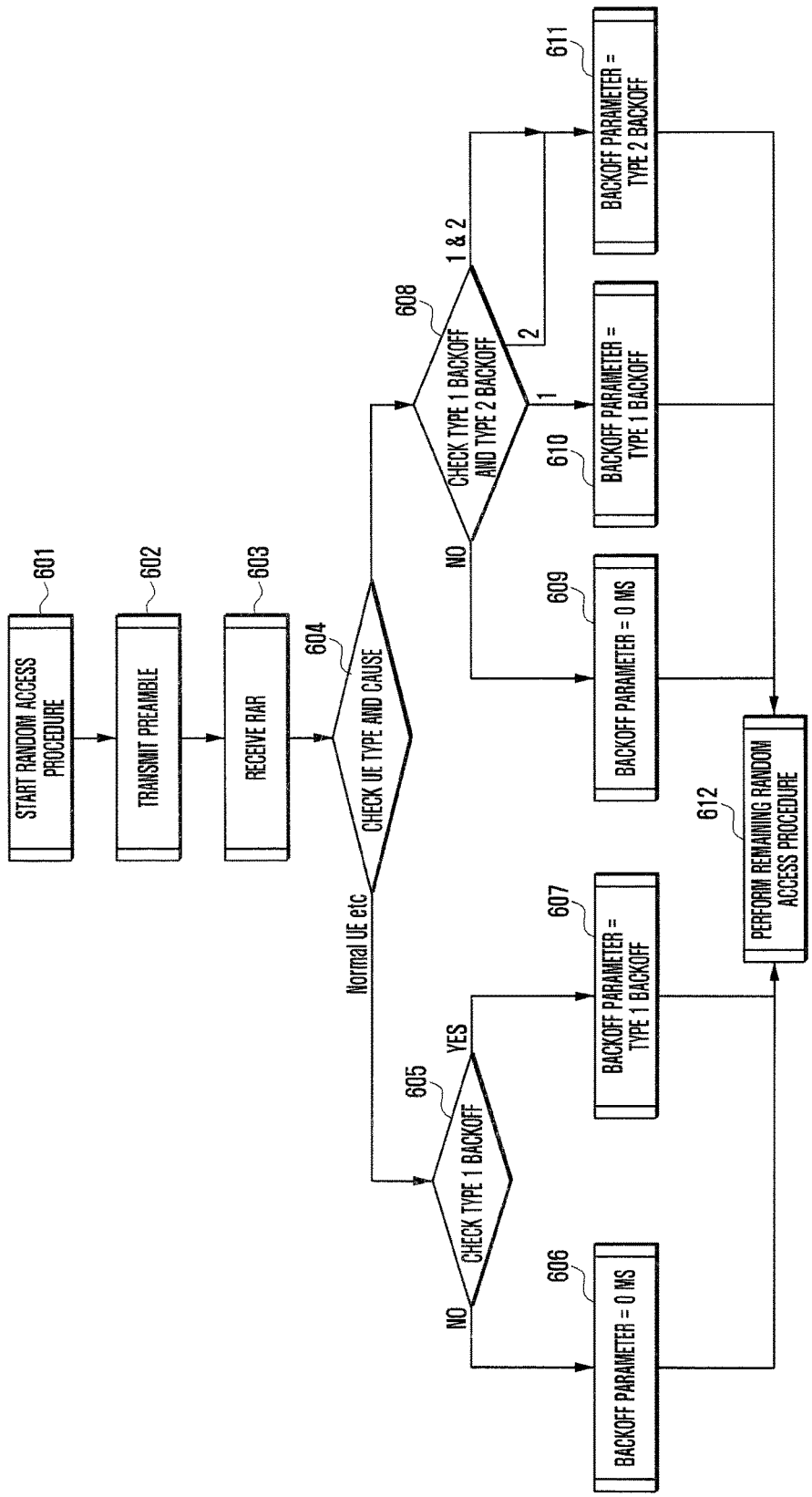
FIG. 6 illustrates a flowchart that describes a method for operating a UE, according to a second exemplary embodiment of the present invention.

FIG. 6 illustrates a flowchart that describes a method for operating UE, according to a second exemplary embodiment of the present invention.

After performing EAB and ACB procedures as shown in FIG. 5, a UE makes an attempt to perform RRC connection establishment via a Random Access procedure at step 601. To this end, the UE transmits a Random Access Preamble to an eNB at step 602. The Random Access Preamble that will be transmitted may be selected randomly from among preambles by the UE or designated by the eNB.

After transmitting the Random Access Preamble to the eNB, the UE makes an attempt to receive an RAR message in a preset period of time at step 603. The UE checks the PDCCH to receive a RAR message, for a preset period of time, after a period of time has elapsed from a time point that it transmits the Preamble.

If the UE receives a MAC PDU addressed by a proper Radio Network Temporary Identity (RA-RNTI) in the preset period of time, the UE receives and decodes the RAR. The proper RA-RNTI is mapped, one-to-one, to a transmission resource (defined in time domain and frequency domain) to which the UE transmits the Preamble.

If the UE receives an RAR and ascertains that the RAR includes a backoff at step 603, the UE checks the type of UE and a cause of RRC connection establishment in order to determine the procedure to process the backoff at step 604.

If the UE ascertains that the UE is a non-MTC UE or, although the UE is an MTC device, the cause of RRC connection establishment is not a delayTolerantAccess at step 604, the UE proceeds with step 605. On the contrary, if the UE is an MTC device and the cause of RRC connection establishment is a delayTolerantAccess at step 604, the UE proceeds with step 608.

A non-MTC type of UE refers to general UE, not an MTC device. An MTC device refers to a machine type communication device that is provided with a Machine to Machine (M2M) service and performs communication between machines, not between humans or between humans and machines An example of the MTC device is a metering device providing smart metering services. MTC devices are also referred to as UEs that are configured for EAB.

MTC devices generate data that is not urgent. MTC devices establish an RRC connection in order to transmit such data, in such a way that the EstablishmentCause field of an RRC connection request message, RRC CONNECTION REQUEST, is set as delayTolerantAccess.

MTC devices may transmit more important data (e.g., an alarm message, etc.). In that case, MTC devices may employ mo-Signaling, for example, for the EstablshmentCause field.

In an exemplary embodiment of the present invention, MTC devices are controlled via Type 2 backoff by default. However, if MTC devices are intended to transmit important data, it is preferable that they are subject to the same congestion control as non-MTC UEs.

When an MTC device establishes a RRC connection, the MTC device stores the establishment cause, EstablishmentCause, that it used. After that, the MTC device uses the EstablishmentCause to determine whether it is a delayTolerantAccess or the other value when performing a Random Access Procedure, thereby determining a backoff value according to the result.

If a UE in an idle mode performs a Random Access procedure to operate in a connection state, i.e., to perform a RRC connection establishment process, the UE checks whether EstablishmentCause of an RRC CONNECTION REQUEST message to be transmitted is delayTolerantAccess and then determines the operation according to the result.

After checking the type of UE and a cause of RRC connection establishment at step 604,

- if the UE is not an MTC device, the UE performs a congestion control process, employing Type 1 backoff at step 605;
- if the UE is an MTC device that performs an Random Access procedure for RRC connection establishment and the EstablishmentCause of an RRC CONNECTION REQUEST message is not delayTolerantAccess, the UE performs a congestion control process, employing Type 1 backoff at step 605;
- if the UE is an MTC device that performs an Random Access procedure for RRC connection establishment and the EstablishmentCause of an RRC CONNECTION REQUEST message is not delayTolerantAccess, the UE performs a congestion control process, employing Type 1 backoff at step 605;
- if the UE is an MTC device that performs an Random Access procedure for RRC connection establishment and the EstablishmentCause of an RRC CONNECTION REQUEST message is delayTolerantAccess, the UE performs a congestion control process, employing Type 1 backoff and Type 2 backoff at step 608;
- if the UE is an MTC device in an RRC connection state and the EstablishmentCause has been set to a cause (e.g., emergency, highPriorityAccess, mo-Signaling, or mo-Data) other than delayTolerantAccess, when establishing the current RRC connection, the UE performs a congestion control process, employing Type 1 backoff at step 605; and
- if the UE is an MTC device in an RRC connection state and the EstablishmentCause has been set to delayTolerantAccess, when establishing the current RRC connection, the UE performs a congestion control process, employing Type 1 backoff and Type 2 backoff at step 608.

If the UE is a non-MTC UE or an MTC device with high priority access, the UE checks whether the received RAR includes Type 1 backoff at step 605.

If the UE ascertains that the received RAR does not include Type 1 backoff at step 605, it sets the backoff parameter to 0 ms at step 606. This means that backoff is not employed when re-transmitting a Preamble due to a variety of causes, such as a congestion resolution failure, etc.

On the contrary, if the UE ascertains that the received RAR includes Type 1 backoff at step 605, the UE sets the backoff parameter to a value indicated by Type 1 backoff at step 607. This means that a value is randomly selected between '0' and a value stored in the backoff parameter when re-transmitting a Preamble due to a variety of causes, such as a congestion resolution failure, etc., and the backoff is performed by the selected value.

If the UE is an MTC device that performs access, delay-TolerantAccess, the UE checks whether the received RAR includes Type 1 backoff and Type 2 backoff at step 608. The format of RAR will be described in detail further below with reference to FIG. 7.

If the received RAR does not include Type 1 backoff and Type 2 backoff at step 608, the UE stores '0' ms as a backoff parameter at step 609.

If the received RAR includes Type 1 backoff at step 608, the UE stores Type 1 backoff value as a backoff parameter at step 610. The stored value is applied to the transmission of the Preamble.

If the received RAR includes Type 1 backoff and Type 2 backoff at step 608, the UE stores Type 2 backoff value as a backoff parameter at step 611. The stored value is applied to the transmission of the Preamble.

Meanwhile, if Type 2 backoff exists and is less than Type 1 backoff (or if Type 2 backoff is 0 ms but Type 1 backoff is not 0 ms), the UE stores Type 1 backoff as a backoff parameter. It is normal that the exceptional case does not occur; however, the exceptional case is prepared to process a case that occurs since Type 2 backoff always exists during the standard process, and that may be determined by indicating '0' ms if there is no need to apply a Type 2 backoff.

After that, the UE performs a Random Access process, e.g., a message transmitting process, a contention resolution process, or the like, at step 612.

Figure 7:
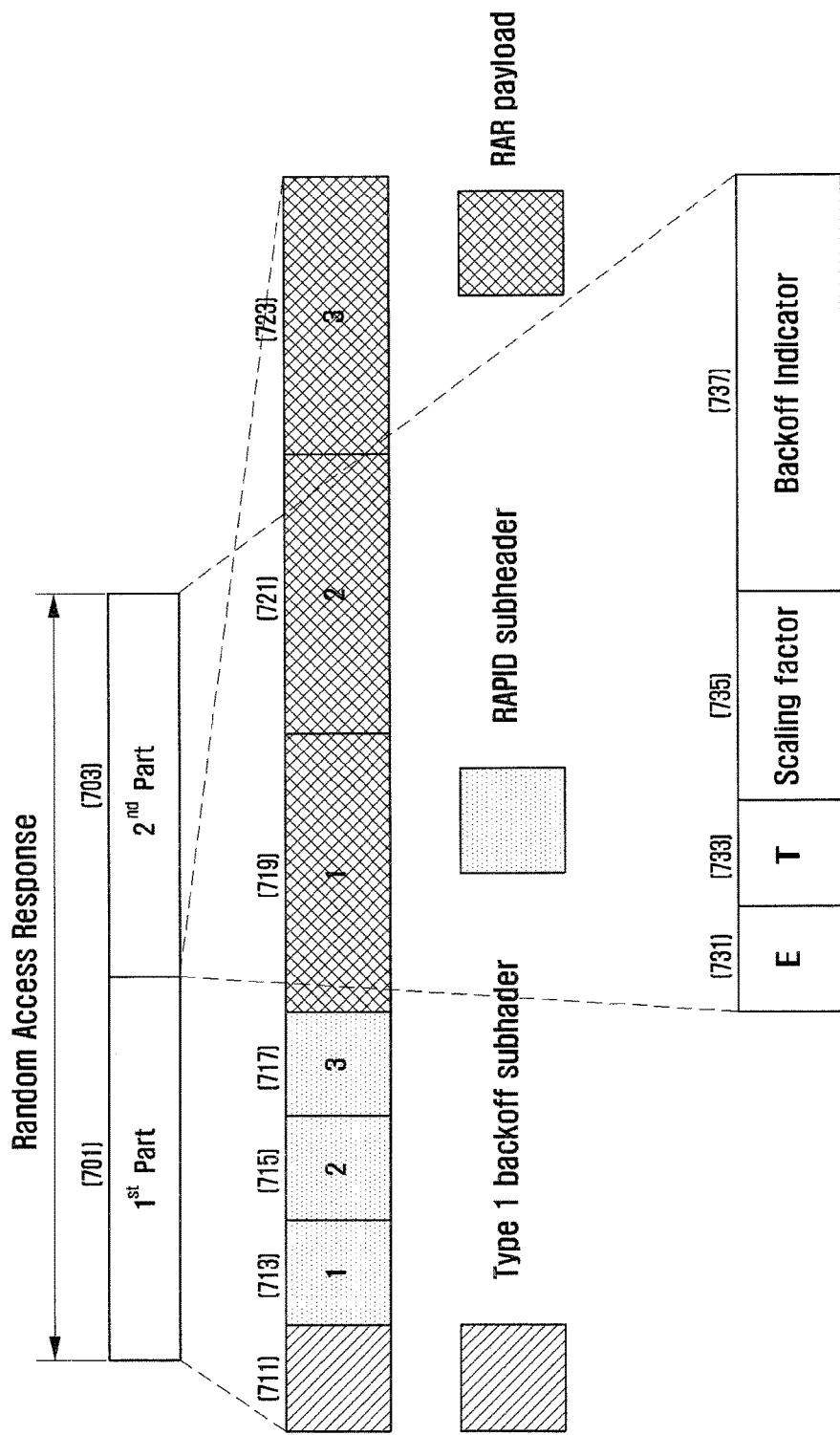
FIG. 7 illustrates an example of a format of a new Random Access Response (RAR) message, according to an exemplary embodiment of the present invention.

FIG. 7 illustrates an example of a format of a new RAR message, according to an exemplary embodiment of the present invention.

A RAR message includes two parts, first part 701 and second part 703.

The first part 701 is configured in the same format as a RAR of the related art, so that it can be detected by all UEs. That is, the first part 701 includes a number of MAC subheaders 711, 713, 715 and 717 and a number of RAR payloads 719, 721 and 723.

The MAC subheaders have one byte and includes Type 1 backoff information 711 or Random Access Preamble Identifiers (RAPIDs) 713, 715 and 717. The information MAC subheaders include is indicated by a value of a bit position (e.g., the second bit). The MAC subheaders may or may not include Type 1 backoff 711. If Type 1 backoff 711 is included in the MAC subheaders, it is indicated by the first MAC subheader.

The RAR payloads 719, 721 and 723 include information regarding reverse resource allocation and information regarding a transmission timing control command, Timing advance Command.

The second part 703 includes Type 2 backoff. The UE determines the presence of Type 2 backoff and the value, referring to the format of the second part 703.

Type 2 backoff is located at the first byte of the second part 703, for example. The second part 703 configures a number of components 731, 733, 735 and 737.

An E bit 731 indicates whether the next byte is a padding or another subheader.

A T bit 733 indicates whether a corresponding byte is related to Type 2 backoff.

A scaling factor 735 is a value that is combined with a backoff indicator and defines the final Type 2 backoff.

Type 2 backoff=Scaling factor×Backoff Indicator

The Scaling factor has two bits and the definitions presented in the following table.

| Scaling factor | Definitions |
| --- | --- |
| 0 | x 1 |
| 1 | x $n_1$ |
| 2 | x $n_2$ |
| 3 | x $n_3$ |

Referring to the table, if the scaling factor is '0,' Type 2 backoff can be calculated by multiplying Backoff Indicator by '1.'

As such, backoff Indicator used for Type 1 backoff is reused to calculate Type 2 backoff. Type 2 backoff should indicate a larger value than Type 1 backoff. However, the exemplary embodiment of the present invention is implemented in such a way that the scaling factor and backoff indicator used for Type 1 backoff are reused for the other type of backoff, thereby avoiding defining an additional backoff.

The UE calculates a start time point of the second part as follows.

First, UE identifies the size of the first part. An MAC subheader and each RAR payload are one byte and six bytes in size, respectively. The UE can calculate from which byte the second byte starts using Equation 4.

$$n + m \times 7 \quad \text{[Equation 4]}$$

where n is the number of subheaders of Type 1 backoff and m is the number of RAPID subheaders. Here, n is '0' or '1.

The second part 703 follows the last byte of the first part 701.

Figure 8:
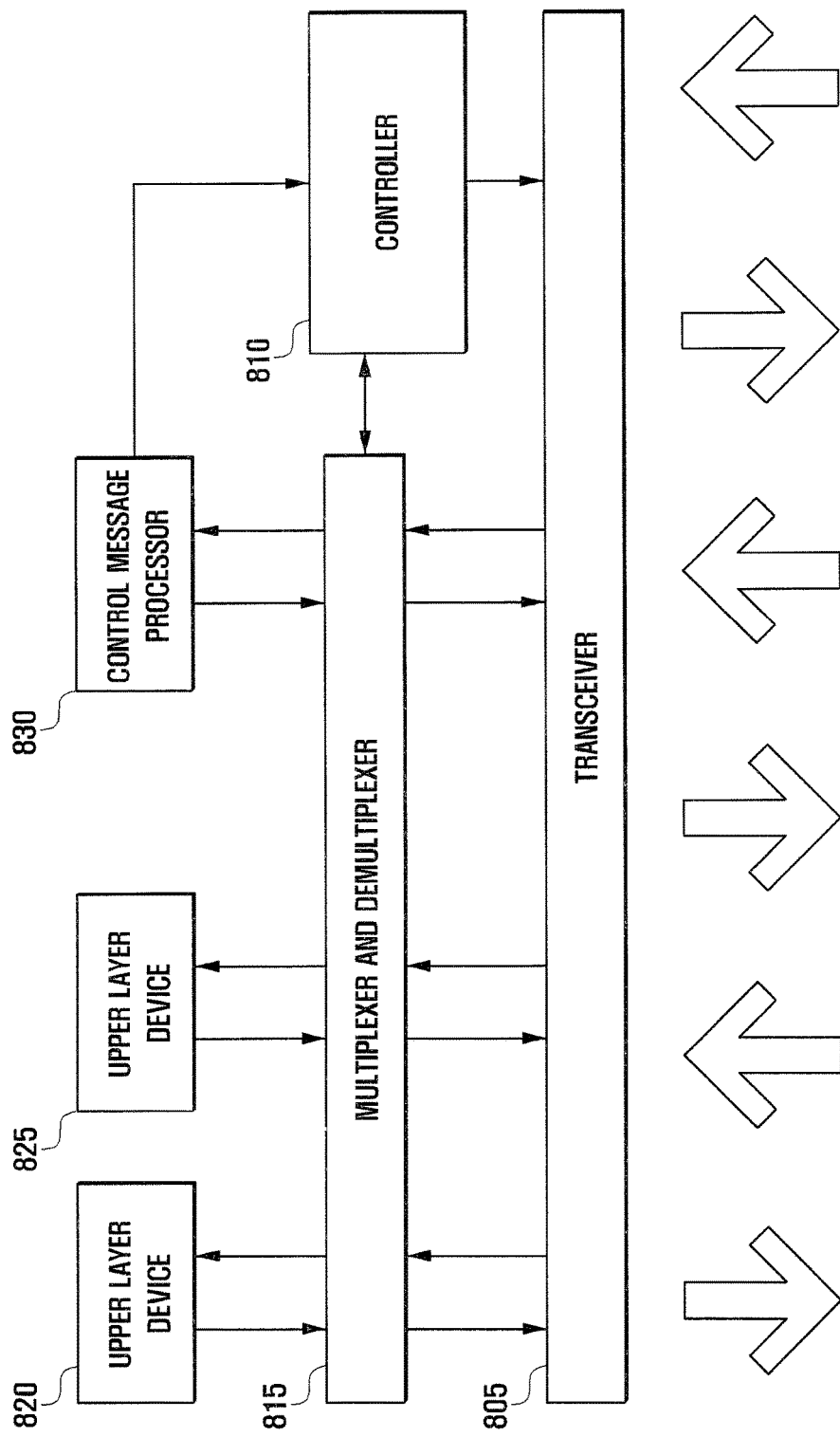
FIG. 8 illustrates a schematic block diagram of a UE according to an exemplary embodiment of the present invention.

FIG. 8 illustrates a schematic block diagram of user equipment according to an exemplary embodiment of the present invention.

Referring to FIG. 8, the UE includes a transceiver 805, a controller 810, a multiplexer and demultiplexer 815, a control message processor 830, upper layer devices 820 and 825.

The transceiver 805 receives data and control signals via the forward channel of a serving cell and transmits data and control signals via the reverse channel. If the UE establishes channels with a number of serving cells, the transceiver 805 can transmit and receive data and control signals to and from the serving cells.

The multiplexer and demultiplexer 815 multiplexes data from the control message processor 830 or the upper layer devices 820 and 825 or de-multiplexes data from the transceiver 805, and transfers the processed data to the control message processor 830 or the upper layer devices 820 and 825.

The control message processor 830 processes control messages from an eNB and performs corresponding operations. For example, the control message processor 830 receives Discontinuous Reception (DRX)-related parameters and transfers them to the controller 810.

The upper layer devices 820 and 825 may be configured according to types of services. For example, the upper layer devices 820 and 825 process data, generated when user services such as File Transfer Protocol (FTP) or VoIP services are provided, and transfer them to the multiplexer and demultiplexer 815. The upper layer devices 820 and 825 may also process data, from the multiplexer and demultiplexer 815, and transfers them to the upper layer service application.

The controller 810 receives a scheduling command via the transceiver 805, identifies the reverse grants, and controls the transceiver 805 and the multiplexer and demultiplexer 815 to transmit them as a proper transmission resource, in the reverse direction, at a proper time point. The controller 810 also controls the transceiver 805 to perform DRX operation and Channel State Information (CSI)/Sounding Reference Signal (SRS) transmission.

The controller 810 determines whether RRC connection establishment corresponds to Cause 1 or 2. If RRC connection establishment corresponds to Cause 1, the controller 810 establishes an RRC connection so that it is not subject to EAB. On the contrary, if RRC connection establishment corresponds to Cause 2, the controller 810 determines whether an EAB procedure is employed according to an SIB transmitted from an eNB, and performs EAB according to the determination.

Cause 1 may be one or more cases where a UE makes an access attempt to receive a call, a UE makes an emergency call, and a UE makes an access attempt with a high priority. Cause 2 may be one or more cases where a UE makes an access attempt to make a call to transmit data a UE makes an access attempt to make a call to transmit control message, and a UE makes an access attempt to make a call irrespective of a transmission delay such as an MTC service.

The controller 810 determines whether to employ ACB according to the establishment of SIB transmitted from an eNB, and employs the ACB procedure according to the determination. That is, if the controller 810 ascertains cases where the access is not subject to EAB because it corresponds to Cause 1, and the access is not barred according to the result of employing EAB procedure, the controller 810 determines whether to employ ACB according to the establishment of SIB transmitted from an eNB, and employs the ACB procedure according to the determination.

If the access is not barred according to the result of employing the EAB and ACB, the controller 810 requests RRC connection establishment from the eNB.

Although the exemplary embodiment of the UE is implemented in such a way that the components are distinguished according to the functions, it should be understood that the present invention is not limited to the exemplary embodiment. For example, the exemplary embodiment may be modified in such a way that the controller 810 can perform the operations of the control message processor 830. This principle can also be applied to the eNB described as follows.

Figure 9:
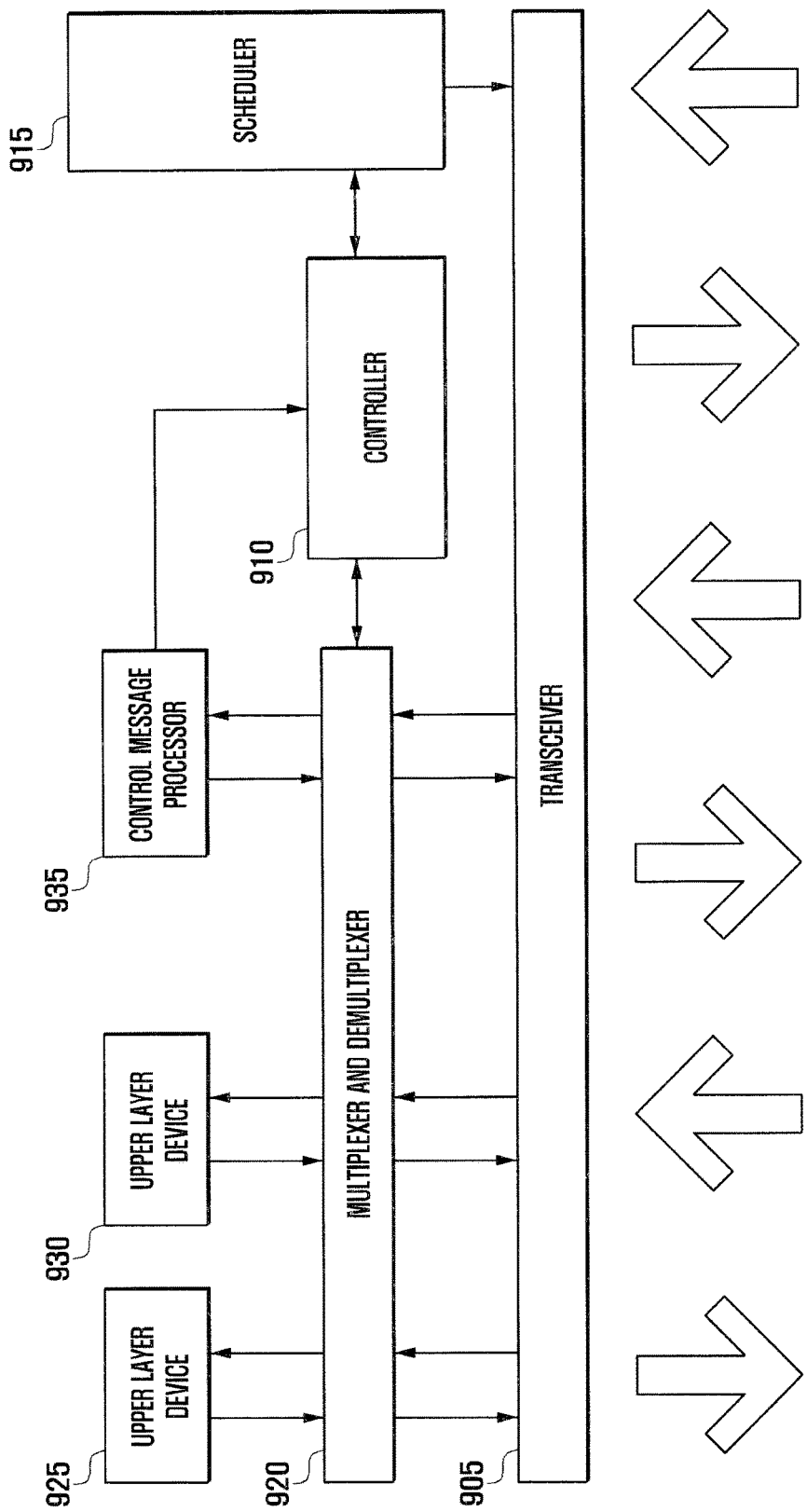
FIG. 9 illustrates a schematic block diagram of an evolved Node B (eNB) according to an exemplary embodiment of the present invention.

FIG. 9 illustrates a schematic block diagram of an eNB according to an exemplary embodiment of the present invention.

Referring to FIG. 9, the eNB includes a transceiver 905, a controller 910, a multiplexer and demultiplexer 920, a control message processor 935, upper layer devices 925 and 930, and a scheduler 915.

The transceiver 905 transmits data and control signals via the forward carriers and receives data and control signals via the reverse carriers. If a number of carriers are set, the transceiver 905 transmits and receives data and control signals via the carriers.

The multiplexer and demultiplexer 920 multiplexes data from the control message processor 935 or the upper layer devices 925 and 930 or de-multiplexes data from the transceiver 905, and transfers the processed data to the control message processor 935 or the upper layer devices 925 and 930 or the controller 910.

The control message processor 935 processes control messages from the UE and performs corresponding operations. The control message processor 935 also generates control messages to be transmitted to the UE and transmits them to the lower layer.

The upper layer devices 925 and 930 may be configured according to types of services. For example, the upper layer devices 925 and 930 process data, generated when user services such as FTP or VoIP services are provided, and transfer them to the multiplexer and demultiplexer 920. The upper layer devices 925 and 930 may also process data, from the multiplexer and demultiplexer 920, and transfers them to the upper layer service application.

The controller 910 detects a time point when UE will transmit CSI/SRS and controls the transceiver 905 to transmit CSI/SRS.

The scheduler 915 allocates transmission resources at a proper time point, considering the buffer state, the channel state and Active time of the UE. The scheduler 915 processes signals transmitted from or to the UE.

As described above, the system and method according to exemplary embodiments of the present invention can control the operations of UEs that make attempts to access a network, thereby preventing excessive access.

While the invention has been shown and described with reference to certain exemplary embodiments thereof, it will be understood by those skilled in the art that various changes in form and details may be made therein without departing from the spirit and scope of the of the invention as defined in the appended claims and their equivalents.

What is claimed is:

1. A method by a base station in a wireless communication system, the method comprising:
transmitting configuration information corresponding to an extended access barring (EAB);
receiving a first random access preamble from a user equipment (UE), if the EAB is not applied to the UE;
transmitting a random access response including a first type backoff and a second type back off to the UE; and
receiving a second random access preamble from the UE.

2. The method of claim 1, wherein the UE:
checks if the EAB is applied to the request for the RRC connection, whether access to a cell is barred by the EAB; and
identifies, if the access to the cell is barred by the EAB, a failure of the RRC connection.

3. The method of claim 2, wherein an access to a cell is considered as barred, if the UE belongs to a category of UEs as indicated in an EAB Category contained in an EAB parameter and if an AC of the UE belongs to a range excluding the ACs 11 to 15.

4. The method of claim 1, further comprising:
transmitting a system information block to the UE; and
wherein an access barring check is performed by the UE, if an AC barring parameter of the ACB is included in the system information block.

5. The method of claim 4, wherein the UE:
considers, if the UE has one or more ACs with a value in a first range, which is valid for the UE, access to a cell as not barred;
generates, if the UE does not have the one or more ACs with the value in the first range, a random number uniformly distributed in the range of 0 to 1; and
considers, if the random number is lower than a value indicated by the AC barring parameter, access to the cell as not barred, and considers, if the random number is not lower than the value indicated by the AC barring parameter, access to the cell as barred.

6. A base station in a wireless communication system, the base station comprising:
a transceiver configured to transmit and receive signals; and
a processor configured to:
transmit configuration information corresponding to an extended access barring (EAB),
receive a random access preamble from a user equipment (UE), if the EAB is not applied to the UE,
transmit a random access response including a first type backoff and a second type back off to the UE, and
receive a second random access preamble from the UE.

7. The base station of claim 6, wherein the processor is further configured to:
check, if the EAB is applied to the request for the RRC connection, whether access to a cell is barred by the EAB; and
identify, if the access to a cell is barred by the EAB, a failure of the RRC connection.

8. The base station of claim 7, wherein an access to a cell is considered as barred, if the UE belongs to a category of UEs as indicated in an EAB Category contained in an EAB parameter and if an AC of the UE belongs to a range excluding the ACs 11 to 15.

9. The base station of claim 6,
wherein the processor is further configured to transmit a system information block to the UE; and
wherein an access barring check is performed by the UE, if an AC barring parameter for the ACB is included in the system information block.

10. The base station of claim 9, wherein the UE:
considers, if the UE has one or more ACs with a value in a first range, which is valid for the UE, access to a cell as not barred; and
generates, if the UE does not have the one or more ACs with the value in the first range, a random number uniformly distributed in the range of 0 to 1; and
considers, if the random number is lower than a value indicated by the AC barring parameter, access to the cell as not barred, and considers, if the random number is not lower than the value indicated by the AC barring parameter, access to the cell as barred.

* * * * *